US012811148B2

(12) United States Patent
Iwasaki

(10) Patent No.: US 12,811,148 B2
(45) Date of Patent: Nov. 24, 2026

(54) CARBONACEOUS MATERIAL

(71) Applicant: KURARAY CO., LTD., Kurashiki (JP)

(72) Inventor: Hideharu Iwasaki, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 105 days.

(21) Appl. No.: 18/838,674

(22) PCT Filed: Jan. 27, 2023

(86) PCT No.: PCT/JP2023/002634
§ 371 (c)(1),
(2) Date: Aug. 15, 2024

(87) PCT Pub. No.: WO2023/157610
PCT Pub. Date: Aug. 24, 2023

(65) Prior Publication Data

US 2025/0174659 A1 May 29, 2025

(30) Foreign Application Priority Data

Feb. 21, 2022 (JP) ................................ 2022-024678

(51) Int. Cl.
*H01M 4/587* (2010.01)
*H01M 4/02* (2006.01)

(52) U.S. Cl.
CPC ...... *H01M 4/587* (2013.01); *H01M 2004/021* (2013.01)

(58) Field of Classification Search
CPC ................................ C01B 2/00; H01M 4/587
See application file for complete search history.

(56) References Cited

U.S. PATENT DOCUMENTS

| | | | | |
|---|---|---|---|---|
| 12,080,890 | B2 * | 9/2024 | Izawa | H01M 4/587 |
| 2017/0317340 | A1 | 11/2017 | Nishikawa | |
| 2018/0183041 | A1 * | 6/2018 | Tour | C01B 32/168 |
| 2018/0323433 | A1 * | 11/2018 | Kawakami | H01M 4/587 |

FOREIGN PATENT DOCUMENTS

| | | | | |
|---|---|---|---|---|
| CN | 111517319 A | 8/2020 | | |
| EP | 2709195 A1 | 3/2014 | | |
| JP | 2017084707 A | 5/2017 | | |
| JP | 2018147878 A | 9/2018 | | |
| JP | 2021116196 A | 8/2021 | | |
| JP | 2021116197 A | 8/2021 | | |
| JP | 2021116198 A | 8/2021 | | |
| JP | 2021120331 A | 8/2021 | | |
| WO | WO-2020218250 A1 * | 10/2020 | | C01B 32/05 |

OTHER PUBLICATIONS

Translation WO 2020218250 A1 (Year: 2020).*
Chang, Z, et al., “Influence of H2 reduction on lignin-based hard carbon performance in lithium ion batteries”, Electrochimica Acta, 2015, vol. 176, pp. 1352-1357.
English translation of the International Preliminary Report on Patentability and Written Opinion issued Aug. 27, 2024 in PCT/JP2023/002634, 4 pages.
International Search Report issued Mar. 28, 2023 in PCT/JP2023/002634, 2 pages.
Yang, Z., et al., “Cooperation of nitrogen-doping and catalysis to improve the Li-ion storage performance of lignin-based hard carbon”, Journal of Energy Chemistry, 2018, vol. 27, No. 1, pp. 1-7.
Extended European Search Report issued Mar. 5, 2026, in corresponding European Patent Application No. 23756138.6, 10 pages.

* cited by examiner

*Primary Examiner* — Hoa (Holly) Le
(74) *Attorney, Agent, or Firm* — Element IP, PLC

(57) ABSTRACT

The present invention relates to a carbonaceous material having: a ratio of a sulfur element content $S_{XPS}$ determined by an XPS method to a sulfur element content $S_{NDIR}$ determined by an NDIR method ($S_{XPS}/S_{NDIR}$) of 0.20 or more and 0.78 or less; and a specific surface area determined by a BET method of 40 $m^2/g$ or less.

10 Claims, No Drawings

CARBONACEOUS MATERIAL

TECHNICAL FIELD

The present patent application claims Paris Convention priority based on Japanese Patent Application No. 2022-024678 (filing date: Feb. 21, 2022), which is incorporated herein by reference in its entirety.

The present invention relates to a carbonaceous material.

BACKGROUND ART

Carbonaceous materials are used for electrodes of various batteries such as aqueous electrolyte batteries such as lead carbon batteries, non-aqueous electrolyte batteries such as lithium ion batteries and sodium ion batteries, solid-state batteries, and fuel cells, and a carbonaceous material having characteristics according to its application is demanded. For example, a non-aqueous electrolyte battery to be mounted on an electric vehicle or a hybrid vehicle is required to have a high discharge capacity in order to mount a battery having a longer cruising distance on the vehicle in addition to satisfying the requirements of limited space and mass. In addition, since such a battery is charged and discharged when a brake and an accelerator are depressed, rapid charge and discharge in a short time in a battery having low resistance are required.

A carbonaceous material derived from non-graphitizable carbon is used for an electrode of a non-aqueous electrolyte battery. As a carbon source of non-graphitizable carbon, petroleum pitch, coal pitch, or the like has conventionally been used. However, in recent years, in view of the influence on the global environment and the decrease in petroleum reserves, there has been a demand for carbonaceous materials using a carbon source that can substitute for those carbon sources recited above. One example thereof is a carbonaceous material using lignin, which is discharged in a large amount as a by-product in a process of manufacturing pulp in the paper industry, as a carbon source.

For example, Non-patent Document 1 describes a carbonaceous material obtained by stabilizing acetone-extracted lignin by heating at 300 °C under a nitrogen atmosphere, then carbonizing the stabilized lignin by heating at 800 °C under a nitrogen atmosphere, and then reducing the carbonized lignin with hydrogen at 800 °C. Non-patent Document 2 describes a carbonaceous material obtained by carbonizing and sintering a lignin-melamine resin prepared by dissolving lignin and melamine in formaldehyde. Patent Document 1 describes a carbonaceous material having a sulfur element content of 0.8% by mass or more and a true density determined by a butanol method of 1.48 g/cm$^3$ or more and 1.62 g/cm$^3$ or less, and describes that lignin having a sulfur element content of 0.1% by mass or more can be used as a starting material for the carbonaceous material.

In addition, Patent Document 2 discloses a method for producing a carbonaceous material for a non-aqueous electrolyte secondary battery, the method including a calcination step of calcining a carbon precursor or a mixture of the carbon precursor and a volatile organic substance in an inert gas atmosphere at 800 to 1400 °C to obtain a carbonaceous material, and a post-pulverization step and/or a post-classification step of adjusting a specific surface area of the carbonaceous material determined by a nitrogen adsorption BET three-point method to 20 to 75 m$^2$/g by pulverization and/or classification.

PRIOR ART DOCUMENTS

Patent Documents

Patent Document 1: WO 2020/218250 A1
Patent Document 2: JP-A-2017-084707

Non-Patent Documents

Non-patent Document 1: Electrochimica Acta, 2015, Vol. 176, pp. 1352-1357
Non-patent Document 2: Journal of Energy Chemistry, 2018, Vol. 27, No. 1, pp. 1-7

SUMMARY OF THE INVENTION

Problems to be Solved by the Invention

However, according to the study by the present inventors, the carbonaceous materials described in Non-patent Documents 1 and 2 have problems of large irreversible capacity and low lithium efficiency. Patent Document 1 describes that when the carbonaceous material has the specific sulfur element content and the specific true density, a battery including an electrode containing the carbonaceous material is superior in discharge capacity, charge/discharge efficiency, resistance, and output characteristics, but the document contains no description on a distribution state of sulfur element in the carbonaceous material. In addition, Patent Document 2 has no description on sulfur element content.

There is always a demand for higher battery characteristics, and there is a case where further improved battery characteristics (for example, discharge capacity, charge/discharge efficiency, resistance, and discharge capacity retention rate) are required for the carbonaceous materials described in the patent documents cited above.

Therefore, an object of the present invention is to provide a carbonaceous material that results in a battery having improved discharge capacity, charge/discharge efficiency, resistance (for example, initial direct current resistance), and discharge capacity retention rate.

Solutions to the Problems

The present inventors conducted detailed studies on carbonaceous materials in order to solve the above problems, and have accomplished the present invention. That is, the present invention includes the following preferred embodiments.

[1] A carbonaceous material having a ratio of a sulfur element content $S_{XPS}$ determined by an XPS method to a sulfur element content $S_{NDIR}$ determined by an NDIR method ($S_{XPS}/S_{NDIR}$) of 0.20 or more and 0.78 or less, and a specific surface area determined by a BET method of 40 m$^2$/g or less.

[2] The carbonaceous material according to [1], wherein the $S_{NDIR}$ is 2.00% by mass or less based on a total mass of the carbonaceous material.

[3] The carbonaceous material according to [1] or [2], wherein the $S_{XPS}$ is 1.40% by mass or less based on a total mass of the carbonaceous material.

[4] The carbonaceous material according to any one of [1] to [3], wherein the specific surface area determined by the BET method is 1.0 m$^2$/g or more.

[5] The carbonaceous material according to any one of [1] to [4], wherein the carbonaceous material has a volume-average particle size of 2 μm or more and 40 μm or less.

[6] The carbonaceous material according to any one of [1] to [5], wherein an interplanar spacing $d_{002}$ of a (002) plane of the carbonaceous material measured using a CuKα ray is 3.75 Å or more and 3.95 Å or less.

[7] The carbonaceous material according to any one of [1] to [6], wherein a half-value width of a D band near 1360 $cm^{-1}$ in a Raman spectrum of the carbonaceous material is 200 $cm^{-1}$ or more and 270 $cm^{-1}$ or less.

[8] The carbonaceous material according to any one of [1] to [7], wherein a ratio of a true density $\rho_{Bt}$ determined by a butanol method to a true density $\rho_{He}$ determined by a helium method ($\beta_{Bt}/\beta_{He}$) is 0.71 or more and 0.85 or less.

[9] An electrode comprising the carbonaceous material according to any one of [1] to [8].

[10] A battery comprising the electrode according to [9].

Effects of the Invention

In accordance with the present invention, it is possible to provide a carbonaceous material that results in a battery having improved discharge capacity, charge/discharge efficiency, resistance (for example, initial direct current resistance), and discharge capacity retention rate.

DETAILED DESCRIPTION

Hereinafter, embodiments of the present invention will be described in detail. It should be noted that the following are examples of the embodiments of the present invention, and it is not intended to limit the present invention to the following embodiments.

[Carbonaceous Material]

In the carbonaceous material of the present invention, a ratio of a sulfur element content $S_{XPS}$ determined by an XPS method to a sulfur element content $S_{NDIR}$ determined by an NDIR method ($S_{XPS}/S_{NDIR}$) is 0.20 or more and 0.78 or less, and a specific surface area determined by a BET method is 40 $m^2/g$ or less.

<Sulfur Element Content>

The sulfur element content $S_{NDIR}$ means a sulfur element content measured by a combustion in oxygen stream (high-frequency induction heating furnace system)-non-dispersive infrared absorption method (NDIR method). In the NDIR method, the sulfur element content in the gas generated by burning a sample in a high-frequency induction heating furnace is measured, and thus the sulfur element content to be measured corresponds to the sulfur element content in the entire sample. The sulfur element content $S_{NDIR}$ can be measured, for example, by the method described in Examples described later.

On the other hand, the sulfur element content $S_{XPS}$ means a sulfur element content measured by X-ray photoelectron spectroscopy (XPS method). In the XPS method, elements present on a surface are analyzed, and thus the sulfur element content to be measured corresponds to the sulfur element content on the surface of the sample. The sulfur element content $S_{XPS}$ can be measured by, for example, the method described in Examples described later.

One of the features of the carbonaceous material of the present invention is that a ratio of a sulfur element content $S_{XPS}$ to a sulfur element content $S_{NDIR}$ is 0.20 or more and 0.78 or less. When the sulfur element content ratio is less than 0.20 or greater than 0.78, it is difficult to obtain a carbonaceous material that results in a battery having desired battery characteristics.

The sulfur element content ratio is preferably 0.21 or more, more preferably 0.22 or more, and particularly preferably 0.23 or more, and is preferably 0.75 or less, more preferably 0.70 or less, and particularly preferably 0.65 or less (for example, 0.55 or less, 0.45 or less, or 0.35 or less). When the sulfur element content ratio is not less than the lower limit value and not more than the upper limit value, it is easy to obtain a carbonaceous material that results in a battery having desired battery characteristics. The reason for this is not clear, but the following non-limiting action mechanism is conceivable.

The presence of sulfur in the carbonaceous material causes distortion in the structure of the carbonaceous material. Therefore, when sulfur exists in the vicinity of the surface and at the inside (particularly, in the vicinity of the surface) of the carbonaceous material, lithium easily enters the carbonaceous material. That is, sulfur contained in the carbonaceous material, particularly, sulfur present in the vicinity of the surface of the carbonaceous material can serve as an inducer of lithium. On the other hand, sulfur and lithium present in the vicinity of the surface may react with each other and the reaction product may leach out. Therefore, when too much sulfur is present in the vicinity of the surface of the carbonaceous material, the charge/discharge efficiency of a battery manufactured using an electrode containing the carbonaceous material may be lowered. In a carbonaceous material having a sulfur element content ratio of 0.20 or more and 0.78 or less, it is considered that sulfur is present in a well-balanced manner in the vicinity of the surface and at the inside of the carbonaceous material and, as a result, such a carbonaceous material can result in a battery having desired battery characteristics.

The sulfur element content ratio of a carbonaceous material can be adjusted to not less than the lower limit value and not more than the upper limit value by, for example, selection of a starting material (containing sulfur element) to be used in production of the carbonaceous material, adjustment of the temperature in a first carbonization step to be described later, adjustment of the temperature in a second carbonization step to be described later, use of a condensing agent, and/or use of a thermally decomposable substance.

In one preferred embodiment of the present invention, the $S_{NDIR}$ is preferably 2.00% by mass or less, more preferably 1.80% by mass or less, still more preferably 1.70% by mass or less, further preferably 1.50% by mass or less, still further preferably 1.10% by mass or less, and particularly preferably 1.00% by mass or less, and is preferably 0.10% by mass or more, more preferably 0.30% by mass or more, still more preferably 0.50% by mass or more, further preferably 0.70% by mass or more, and particularly preferably 0.80% by mass or more based on the total mass of the carbonaceous material. When the $S_{NDIR}$ is not less than the lower limit value and not more than the upper limit value, distortion tends to occur in the carbon skeleton to increase the battery capacity and to result in a battery superior in thermal stability.

In one preferred embodiment of the present invention, the $S_{XPS}$ is preferably 1.40% by mass or less, more preferably 1.00% by mass or less, still more preferably 0.80% by mass or less, and particularly preferably 0.70% by mass or less, and preferably 0.05% by mass or more, more preferably 0.10% by mass or more, and particularly preferably 0.15% by mass or more based on the total mass of the carbonaceous material. When the $S_{XPS}$ is not less than the lower limit value and not more than the upper limit value, a battery having a good balance between the utilization efficiency of lithium ions and the discharge capacity and having a high battery capacity is likely to be provided.

The $S_{NDIR}$ and the $S_{XPS}$ each can be adjusted to not less than the lower limit value and not more than the upper limit value, for example, by hydrolyzing a starting material (containing sulfur element) to be used in production of the carbonaceous material (for example, by a method involving heating the starting material together with an aqueous caustic soda solution), modifying the starting material with a sulfur element-containing component such as sulfuric acid to adjust the modification amount, adjusting the temperature of the first carbonization step, adjusting the temperature of the second carbonization step, using a condensing agent, and/or using a thermally decomposable substance.

<Specific Surface Area Determined by BET Method>

The carbonaceous material has a specific surface area determined by a BET method (hereinafter, also simply referred to as "specific surface area") of 40 $m^2/g$ or less. When the specific surface area is more than 40 $m^2/g$, the decomposition reaction of an electrolytic solution is hardly inhibited, so that it is difficult to obtain a carbonaceous material that results in a battery having desired battery characteristics.

The specific surface area is preferably 30 $m^2/g$ or less, more preferably 25 $m^2/g$ or less, and still more preferably 20 $m^2/g$ or less (for example, 15 $m^2/g$ or less). The specific surface area is usually 1.0 $m^2/g$ or more, preferably 1.5 $m^2/g$ or more, more preferably 2.0 $m^2/g$ or more, still more preferably 3.0 $m^2/g$ or more, and particularly preferably 4.0 $m^2/g$ or more (for example, 5.0 $m^2/g$ or more, 6.0 $m^2/g$ or more, or 10 $m^2/g$ or more). When the specific surface area is not more than the upper limit value and not less than the lower limit value, the decomposition reaction of an electrolytic solution is likely to be inhibited, so that it is easy to obtain a carbonaceous material that results in a battery having desired battery characteristics (in particular, high charge/discharge efficiency and low initial direct current resistance).

The specific surface area can be adjusted to not more than the upper limit value and not less than the lower limit value by, for example, adjustment of the heating temperature (for example, the temperature in the first carbonization step or the temperature in the second carbonization step) or the amount of a thermally decomposable substance added when the thermally decomposable substance is added. The specific surface area can be measured by the method described in Examples described later.

<Volume-Average Particle Size>

The carbonaceous material is preferably in a granular form.

In one preferred embodiment of the present invention, the volume-average particle size of the carbonaceous material is preferably 2 μm or more, more preferably 2.2 μm or more, and particularly preferably 2.5 μm or more, and is preferably 40 μm or less, more preferably 30 μm or less, still more preferably 25 μm or less, and particularly preferably 20 μm or less (for example, 15 μm or less, or 10 μm or less). When the volume-average particle size is not less than the lower limit value, a fine powder that is a factor of increasing the specific surface area of the carbonaceous material tends to be reduced, and an excessive reaction between the carbonaceous material and an electrolytic solution is likely to be inhibited. As a result, the irreversible capacity, which is a capacity that is not dischargeable in spite of being charged, is likely to decrease, and the capacity of a positive electrode is likely to be inhibited from being wasted. It is preferable that the volume-average particle size is not more than the upper limit value, since the diffusion free path of metal ions or hydrogen ions in the carbonaceous material tends to decrease and the contact rate between carbonaceous materials as conductive materials for conducting electrons tends to increase. The volume-average particle size can be adjusted to not less than the lower limit value and not more than the upper limit value by, for example, selection of a starting material to be used in producing the carbonaceous material, or pulverization (and optionally, classification) of the starting material, a carbon precursor, or the carbonaceous material. The volume-average particle size can be measured by, for example, a laser diffraction scattering method or a Coulter method.

<Interplanar Spacing $d_{002}$ of (002) Plane Measured Using CuKα Ray>

In one preferred embodiment of the present invention, the interplanar spacing $d_{002}$ of the (002) plane (hereinafter, also simply referred to as "interplanar spacing $d_{002}$") of the carbonaceous material measured using a CuKα ray is preferably 3.75 Å or more, more preferably 3.78 Å or more, and preferably 3.95 Å or less, more preferably 3.92 Å or less. When the interplanar spacing $d_{002}$ is not less than the lower limit value and not more than the upper limit value, it is easy to obtain a carbonaceous material that results in a battery superior in battery capacity retention rate at low temperatures. In addition, since entry of ions is facilitated, an electrode suitable for not only a lithium ion secondary battery but also a sodium ion secondary battery and a lead battery is easily obtained. The interplanar spacing $d_{002}$ can be adjusted to not more than the upper limit value and not less than the lower limit value, for example, by adjustment of the heating temperature (for example, the temperature in the first carbonization step or the temperature in the second carbonization step). The interplanar spacing $d_{002}$ can be determined by X-ray diffraction.

<Half-Value Width of D Band Near 1360 $cm^{-1}$ in Raman Spectrum>

When the carbonaceous material is subjected to laser Raman spectroscopy, the carbonaceous material usually has a peak near 1360 $cm^{-1}$. This peak is a Raman peak generally referred to as D band, and appears due to disturbance and defect of the graphite structure. The half-value width of a D band near 1360 $cm^{-1}$ (hereinafter, also simply referred to as "half-value width of the D band") represents the amount of the disturbed structure and defects.

In one preferred embodiment of the present invention, the half-value width of the D band of the carbonaceous material is preferably 200 $cm^{-1}$ or more, more preferably 210 $cm^{-1}$ or more, and preferably 270 $cm^{-1}$ or less, more preferably 260 $cm^{-1}$ or less, and still more preferably 250 $cm^{-1}$ or less. When the half-value width of the D band is not less than the lower limit value and not more than the upper limit value, the number of terminal structures is not excessively large, and an increase in electric resistance is easily inhibited, so that the irreversible capacity tends to be reduced, and cycle durability tends to be improved. The half-value width of the D band can be adjusted to not less than the lower limit value and not more than the upper limit value, for example, by adjusting the heating temperature (for example, the temperature in the first carbonization step or the temperature in the second carbonization step) to be relatively low, or by condensing lignin as a starting material with a condensing agent and then carbonizing the condensate at a temperature at which thermal decomposition is inhibited. The half-value width of the D band of the carbonaceous material can be measured by the method described in Examples described later.

<True Density $\rho_{Bt}$ Determined by Butanol Method>

In one preferred embodiment of the present invention, the true density of the carbonaceous material determined by a butanol method (hereinafter, also referred to as "$\rho_{Bt}$") is preferably 1.40 g/cm$^3$ or more, more preferably 1.45 g/cm$^3$ or more, and preferably 1.70 g/cm$^3$ or less, more preferably 1.65 g/cm$^3$ or less, and particularly preferably 1.60 g/cm$^3$ or less. When $\rho_{Bt}$ is not less than the lower limit value and not more than the upper limit value, it is easy to obtain a carbonaceous material that results in a battery having a further enhanced battery capacity. $\rho_{Bt}$ can be adjusted to not less than the lower limit value and not more than the upper limit value, for example, by adjusting the heating temperature (for example, the temperature in the first carbonization step or the temperature in the second carbonization step). $\rho_{Bt}$ is measured in accordance with JIS R 7212:1995.

<True Density $\rho_{He}$ Determined by Helium Method>

The true density measured using helium gas as a replacement medium (hereinafter, also referred to as "$\rho_{He}$") is an index of helium gas diffusibility in a carbonaceous material. The fact that this value is larger and close to the theoretical density of 2.27 g/cm$^3$ of graphitic carbon means that the carbonaceous material has many pores into which helium can enter. That is, it means that open pores are abundantly present. On the other hand, since helium has a very small atomic diameter (0.26 nm), pores into which helium cannot enter can be considered to be closed pores, and the fact that helium gas diffusibility is low means that there are many closed pores even if pores are present.

In one preferred embodiment of the present invention, $\rho_{He}$ of the carbonaceous material is not limited, but is preferably 1.80 g/cm$^3$ or more, and more preferably 1.90 g/cm$^3$ or more. When $\rho_{He}$ is not less than the lower limit value, the carbon structure is developed and a sufficient amount of open pores are present, and thus, there tends to be a reduced number of sites serving as a starting point of a side reaction when lithium ions are dedoped and doped, and as a result, a battery having more improved cycle characteristics is easily obtained. In addition, $\rho_{He}$ is not limited, but is usually 2.30 g/cm$^3$ or less, and preferably 2.20 g/cm$^3$ or less. $\rho_{He}$ can be adjusted to not less than the lower limit value and not more than the upper limit value, for example, by adjustment of the temperature in the second carbonization step. $\rho_{He}$ can be measured by the method described in Examples described later.

<Ratio of True Density $\rho_{Bt}$ Determined by Butanol Method to True Density $\rho_{He}$ Determined by Helium Method ($\rho_{Bt}/\rho_{He}$)>

In one preferred embodiment of the present invention, the ratio of the true density $\rho_{Bt}$ determined by the butanol method to the true density $\rho_{He}$ determined by the helium method (hereinafter, also referred to as "true density ratio" or "$\rho_{Bt}/\rho_{He}$") of the carbonaceous material is preferably 0.71 or more, more preferably 0.72 or more, and preferably 0.85 or less, more preferably 0.83 or less, and particularly preferably 0.80 or less.

As described above, $\rho_{He}$ increases with the number of open pores, and the open pores include not only relatively large pores greatly involving the moisture absorption of the carbonaceous material but also pores having a size with which the degree of involvement in storage and release of lithium ions is considered to be high. Therefore, $\rho_{He}$ affects both hygroscopicity and charge capacity and discharge capacity per volume. On the other hand, the fact that $\rho_{Bt}$ is not less than the lower limit value and not more than the upper limit value is considered to mean that there are many open pores having a size with which the open pores favorably involve storage and release of lithium ions. Number of pores having a size with which butanol cannot enter but helium can enter is reflected on the true density ratio $\rho_{Bt}/\rho_{He}$ and it is considered that pores having such a size have a higher degree of involvement in storage and release of lithium ions than involvement in absorption of the moisture in the atmosphere. That is, the true density ratio $\rho_{Bt}/\rho_{He}$ not less than the lower limit value and not more than the upper limit value is considered to be preferable, since there is a good balance between the point that storage stability is easily secured due to sufficiently low hygroscopicity of the carbonaceous material and the point that an increased charge capacity and an increased discharge capacity per volume are easily obtained. The true density ratio can be adjusted to not less than the lower limit value and not more than the upper limit value by, for example, adjusting the amount of sulfur contained in the starting material, the water soluble content of lignin when lignin is used as a starting material, and/or the first carbonization temperature.

[Method for Producing Carbonaceous Material]

The carbonaceous material of the present invention can be produced by, for example, a production method including:

a first carbonization step of carbonizing a starting material containing sulfur element under a non-oxidizing gas atmosphere to obtain a carbon precursor; and a second carbonization step of carbonizing the carbon precursor under a non-oxidizing gas atmosphere to obtain a carbonaceous material.

<Starting Material>

The starting material containing sulfur element is not particularly limited.

The sulfur element content $S_{NDIR}$ of the starting material determined by the NDIR method is preferably 0.1% by mass or more, more preferably 0.2% by mass or more, and particularly preferably 0.5% by mass or more from the viewpoint of easily inhibiting a decrease in the molecular weight of the starting material and, as a result, easily facilitating carbon condensation to proceed sufficiently. In addition, the $S_{NDIR}$ of the starting material is preferably 5.0% by mass or less, and more preferably 4.5% by mass or less from the viewpoint of easily inhibiting emission of sulfur dioxide or the like that may corrode a device to be used and from the viewpoint of easily obtaining a battery having desired battery characteristics (particularly, charge/discharge efficiency, initial direct current resistance and/or discharge capacity retention rate). The $S_{NDIR}$ of the starting material can be adjusted to not less than the lower limit value and not more than the upper limit value, for example, by hydrolyzing the starting material containing sulfur element (for example, by a method involving heating the starting material with an aqueous caustic soda solution), or by modifying the starting material with a sulfur element-containing component such as sulfuric acid and adjusting the amount of the modification. The $S_{NDIR}$ of the starting material can be measured by the method described in Examples described later.

The starting material is preferably in a granular form.

In one preferred embodiment of the present invention, the volume-average particle size of the starting material is preferably 1 μm or more, more preferably 3 μm or more, still more preferably 5 μm or more, and particularly preferably 10 μm or more (for example, 15 μm or more), and is preferably less than 50 μm, more preferably 45 μm or less, still more preferably 35 μm or less, further preferably 30 μm or less, and particularly preferably 25 μm or less (for example, 20 μm or less). In another preferred embodiment, for example, in an embodiment in which pulverization is performed in a subsequent step, the volume-average particle size of the starting material is preferably 50 μm or more, more preferably 75 μm or more, and still more preferably 100 μm or more, and is preferably 50 mm or less, more preferably 20 mm or less, still more preferably 10 mm or less, further preferably 5 mm or less, and particularly preferably 3 mm or less (for example, 1 mm or less, 500 μm or less, 300 μm or less, or 100 μm or less). When the volume-average particle size is not less than the lower limit value, suction of dust by an operator, dust explosion, or the like hardly occurs. When the volume-average particle size is equal to or less than the upper limit value, the problem that the starting material is oxidized by water generated during carbonization and the carbon physical properties are impaired is easily avoided, and a desired sulfur element content ratio is easily obtained. A starting material whose volume-average particle size is not less than the lower limit value and not more than the upper limit value may be used, or a starting material after the volume-average particle size is adjusted to not less than the lower limit value and not more than the upper limit value by pulverization may be used. The volume-average particle size can be measured by, for example, a laser diffraction scattering method or a Coulter method.

In one preferred embodiment of the invention, the first carbonization step is carried out under conditions where the starting material shrinks little or not at all. In this case, the volume-average particle size differs little or not at all between before and after the first carbonization step. In addition, the pulverizer in the case of performing pulverization is not particularly limited, and pulverizers disclosed as examples in the paragraph of <Pulverization Step> described later can be used. In addition, a pulverized product may be subjected to a classification step in the same manner as the procedure described in the paragraph of <Classification Step> described later.

Examples of a starting material that can be used include, for example, sulfonic acid type ion exchange resins, lignin, and combinations thereof.

Among them, lignin that is insoluble in water and preferably has a melting point of 200 °C or higher is preferable. Such lignin is commonly called kraft lignin and is obtained as waste resulting from cellulose extraction in the paper-making industry. Specifically, for example, it is prepared by acidifying black liquor generated in the process of producing pulp and washing the precipitate formed. The lignin thus obtained usually has a number-average molecular weight of 3500 to 4500, since an ether linkage, which is a main linkage of the lignin, is cleaved during the preparation process and the molecular weight of the lignin is remarkably lowered. In addition, kraft lignin usually has a larger number of phenolic hydroxy groups than lignins obtained by other methods, and is rich in chemical activity. As described above, kraft lignin is preferable from the viewpoint of waste utilization and the viewpoint of easily obtaining a carbonaceous material having a high density due to high chemical activity. From the viewpoint of easily melting in an initial stage of the temperature raising process of the first carbonization step and changing to a state with a high density of a crystalline state during the melting, and as a result, easily obtaining a battery having superior charge/discharge efficiency and low resistance, it is particularly preferable to use lignin having a melting point of preferably 210 °C or higher, and more preferably 230 °C or higher. The melting point can be measured, for example, by differential scanning calorimetry or with a melting point analyzer.

The lignin has a water soluble content of preferably 14% by mass or less, more preferably 12% by mass or less, and particularly preferably 10% by mass or less based on the total mass of the lignin. The water soluble content based on the total mass of the lignin is usually 0.1% by mass or more, and preferably 0.5% by mass or more. When lignin has a water soluble content that is not more than the upper limit value and not less than the lower limit value, it is easy to obtain a carbonaceous material that results in a battery having desired battery characteristics (particularly, battery capacity (particularly, discharge capacity)) due to moderate structural shrinkage associated with the second carbonization. The water soluble content can be adjusted to not more than the upper limit value and not less than the lower limit value by, for example, heating and drying at the time of taking out from the pulp production process or heating treatment before use. The water soluble content can be measured by, for example, Soxhlet extraction.

Only one lignin may be used, or two or more lignins differing in one or more among sulfur element content, melting point, water soluble content, molecular weight, and volatile component content may be used in combination. When two or more lignins are used in combination, at least one of them preferably has the preferred sulfur element content, melting point and/or water soluble content described above.

The lignin may be used as a starting material after being washed with acidic water and thereby reducing metals present in the lignin.

<First Carbonization Step>

In the first carbonization step, a carbon precursor is obtained preferably by carbonizing a starting material containing a sulfur element under a non-oxidizing gas atmosphere, and more preferably by carbonizing lignin having a sulfur element content $S_{NDIR}$ determined by the NDIR method of 0.1% by mass or more and a water soluble content of 14% by mass or less under a non-oxidizing gas atmosphere.

Examples of the non-oxidizing gas include helium, nitrogen, argon, and a combination of two or more thereof. The non-oxidizing gas may contain an oxidizing gas. In that case, the content of the oxidizing gas (particularly, oxygen) is preferably as low as possible, and is usually 1% by volume or less, and preferably 0.1% by volume or less. When the content of the oxidizing gas is not more than the upper limit value, oxidation hardly proceeds in the process of producing the carbon precursor, desired structure construction easily proceeds, and oxidative decomposition of the produced structure hardly occurs. It is preferable that the non-oxidizing gas does not contain an oxidizing gas. This means that the amount of the oxidizing gas is less than the detection limit value of a normal measurement method (for example, gas chromatography).

The feed rate (flow rate) of the non-oxidizing gas is not particularly limited. The feed rate per gram of the starting material or the condensate of the starting material and the condensing agent is usually 1 mL/min or more, preferably 10 mL/min or more, more preferably 30 mL/min or more, and usually 1500 mL/min or less (for example, 1200 mL/min or less, 1000 mL/min or less, or 500 mL/min or less). The first carbonization step can also be performed under reduced pressure, for example, at 10 KPa or less.

The temperature raising rate in the first carbonization step is not particularly limited. The temperature raising rate varies depending on a heating method, but is preferably 1 °C/min or more, more preferably 2 °C/min or more, and preferably 20 °C/min or less, more preferably 18 °C/min or less. The temperature raising rate not less than the lower limit value and not more than the upper limit value is preferable from the viewpoint of easily obtaining good productivity and from the viewpoint of economic efficiency. In addition, the progress of activation by a generated dry distillation gas is easily inhibited, and a favorable carbon density is easily obtained.

The temperature of the first carbonization step is preferably 300 °C or higher, more preferably 350 °C or higher, and still more preferably 380 °C or higher, and is preferably 700 °C or lower, more preferably 600 °C or lower, still more preferably lower than 600 °C, further preferably 550 °C or lower, and particularly preferably 500 °C or lower. In an embodiment in which neither a condensing agent nor a thermally decomposable substance, which may be optionally used as described later, is used, the temperature of the first carbonization step is preferably 300 °C or higher, more preferably 350 °C or higher, and still more preferably 380 °C or higher, and is preferably lower than 600 °C, more preferably 550 °C or lower, and particularly preferably 500 °C or lower. The present inventors have found that the temperature in the first carbonization step affects the movement of sulfur in the material subjected to the first carbonization step. That is, the present inventors have found that sulfur contained in the material tends to move toward the surface of the material by subjecting the material to the first carbonization step, while sulfur tends to stay more inside the material by carbonizing the material at a relatively low temperature. It has also been found that this tendency appears more clearly when no condensing agent is used.

When the temperature in the first carbonization step is not lower than the lower limit value and not higher than the upper limit value, a carbonaceous material having desired physical properties (particularly, sulfur element content ratio) is easily obtained, and a battery having desired battery characteristics (particularly, discharge capacity, initial direct current resistance and/or discharge capacity retention rate) is easily obtained.

The holding time of the temperature in the first carbonization step is not particularly limited. The holding time is preferably 0.1 hours or more, more preferably 0.5 hours or more, and is preferably 20 hours or less, more preferably 15 hours or less, still more preferably 10 hours or less, and further preferably 5 hours or less. When the holding time is not less than the lower limit value and not more than the upper limit value, carbonization easily proceeds sufficiently, so that ignition of a carbonized product hardly occurs in the process of producing the carbonaceous material. In addition, such a holding time is preferable, since it is a time appropriate from the viewpoint of economic efficiency.

<Condensing Agent>

When lignin is used as a starting material, the lignin may be condensed with a condensing agent before the first carbonization step. In this embodiment, the method for producing a carbonaceous material includes a mixing step of mixing lignin and a condensing agent before the first carbonization step, and a condensation step of condensing the lignin in the mixture obtained. In the first carbonization step in this embodiment, the resulting condensate is subjected to the first carbonization step. The present inventors have found that due to the condensation of the lignin with the condensing agent, the sulfur contained in the lignin tends to be inhibited from moving toward the surface of the mixture in the first carbonization step. This is considered to be because the three-dimensional structure of a carbon skeleton is determined more quickly by the condensation, so that sulfur is less likely to move toward the surface, and as a result, the amount of sulfur element on the surface of the carbonized product and that in the vicinity of the surface are reduced. Condensing the lignin with the condensing agent makes it easy to obtain a carbonaceous material having desired physical properties (particularly, sulfur element content ratio).

Examples of the condensing agent include amines, aldehydes, and combinations of two or more thereof.

As necessary, lignin can be made water-soluble by reacting the lignin with excessive amine to produce an ammonium salt of the lignin. Here, the amine can serve as a catalyst in condensing the lignin. In addition, a part of the amine may react with an aldehyde, and the amine easily increases the rate of crosslinking by the aldehyde by forming an imine structure. By crosslinking the lignin, it is also possible to prevent the occurrence of structural defects of a carbonized product due to melting during carbonization, or contamination or corrosion of an apparatus. The crosslinking can proceed even at room temperature, but can be promoted by heating. In addition, in order to make the crosslinking reaction proceed more uniformly, it is preferable to perform water solubilization of the lignin with the amine before addition of the aldehyde.

The amine that can be used is not particularly limited. For example, primary amines such as methylamine, ethylamine, butylamine and aniline, secondary amines such as dimethylamine, diethylamine and dibutylamine, polyamines such as ethylenediamine and polyethyleneimine, melamine and ammonia can be used. These may be used singly or two or more thereof may be used in combination. From the viewpoint of availability, economy and carbonization efficiency, use of melamine and/or ammonia is preferred.

When an amine is used, the use amount thereof is not particularly limited, and may be appropriately selected according to the types of the lignin and the aldehyde to be used. From the viewpoint of crosslinking efficiency and water solubility, the use amount of the amine is preferably 0.01 parts by mass or more, more preferably 0.05 parts by mass or more, still more preferably 0.1 parts by mass or more, further preferably 1 part by mass or more, and particularly preferably 5 parts by mass or more, and is preferably 200 parts by mass or less, more preferably 180 parts by mass or less, still more preferably 150 parts by mass or less, and particularly preferably 100 parts by mass or less based on 100 parts by mass of the lignin.

The aldehyde that can be used is not particularly limited. For example, monoaldehydes such as formaldehyde, acetaldehyde, propionaldehyde, butyraldehyde, valeraldehyde, isovaleraldehyde, hexanal, and benzaldehyde, and dialdehydes such as glyoxal, 1,4-butanedial, 1,6-hexanedial, 1,9-nonanedial, ortho-phthalaldehyde, meta-phthalaldehyde, and terephthalaldehyde can be used. These may be used singly or two or more thereof may be used in combination. From the viewpoint of availability, economy and carbonization efficiency, formaldehyde, benzaldehyde, glyoxal and/or terephthalaldehyde are preferable, and formaldehyde is more preferable. When an aldehyde sparingly soluble in water is used, an organic solvent may be used. The organic solvent to be used is not particularly limited, and for example, alcohols such as methanol, ethanol, and propanol, and ketones such as acetone can be used. The amount of the organic solvent to be used may be appropriately adjusted according to the type of the aldehyde, but is usually preferably 2 to 100 times the mass of the aldehyde.

When an aldehyde is used, the use amount thereof is not particularly limited, and may be appropriately selected according to the lignin to be used. From the viewpoint of the reactivity and the crosslinking efficiency of the aldehyde, the use amount of the aldehyde is preferably 0.01 parts by mass or more, more preferably 0.05 parts by mass or more, still more preferably 0.1 parts by mass or more, further preferably 1 part by mass or more, and particularly preferably 5 parts by mass or more, and is preferably 200 parts by mass or less, more preferably 180 parts by mass or less, still more preferably 150 parts by mass or less, and particularly preferably 100 parts by mass or less based on 100 parts by mass of the lignin.

In the case of solubilizing the lignin in water, the concentration of the lignin in an aqueous lignin solution is not particularly limited. From the viewpoint of the efficiency of removing water in the subsequent step, the concentration of the lignin is preferably 0.1 to 40% by mass, more preferably 0.2 to 30% by mass, and still more preferably 0.5 to 20% by mass based on the mass of the aqueous lignin solution.

The temperature at which the lignin is mixed with the condensing agent is not particularly limited, but is usually in the range of 5 to 90 °C. From the viewpoint of reactivity and volatility, the temperature is preferably 10 to 70 °C, and more preferably 20 to 60 °C. The mixing time is also not limited, but is usually 0.1 to 10 hours, preferably 0.2 to 9 hours, and more preferably 0.3 to 8 hours.

When an aldehyde is used, an acid may be added as a catalyst in order to smoothly advance the crosslinking reaction by the aldehyde. When an acid is used, the use amount thereof is not particularly limited, and may be appropriately selected according to the type of the lignin to be used and the type of the aldehyde to be used. The use amount of the acid is usually 0.1 to 50 parts by mass, and preferably 0.5 to 30 parts by mass based on 100 parts by mass of the aldehyde. The acid that can be used is not particularly limited, and for example, inorganic acids such as hydrochloric acid, sulfuric acid, nitric acid, phosphoric acid and boric acid, and organic acids such as formic acid, acetic acid, propionic acid, oxalic acid, citric acid and tartaric acid can be used. These may be used singly or two or more thereof may be used in combination. From the viewpoint of economy and reactivity, use of hydrochloric acid or acetic acid is preferred.

By heating the mixture of the lignin and the condensing agent under normal pressure or reduced pressure, the condensation of the lignin can be promoted. When the mixture contains a solvent, it is preferable to remove the solvent by heating and solidify the mixture in order to perform the condensation more quickly. The solidification temperature is preferably equal to or higher than the temperature at which the solution is prepared, more preferably 90 to 300 °C, and still more preferably 100 to 250 °C. The method for heating for the solidification is not particularly limited, and hot air, an electric heater, an evaporator, and the like can be used. Evaporation to dryness is preferred. When heating is performed under normal pressure, it is preferable to perform the heating under an inert gas, for example, nitrogen from the viewpoint of safety.

<Second Carbonization Step>

In the second carbonization step performed after the first carbonization step, preferably, the carbon precursor is carbonized under a non-oxidizing gas atmosphere, and more preferably, the carbon precursor is carbonized under a non-oxidizing gas atmosphere at a temperature of 700 °C or higher and 1400 °C or lower to obtain a carbonaceous material.

Examples of the non-oxidizing gas include helium, nitrogen, argon, and a combination of two or more thereof. The second carbonization step may be performed under a gas atmosphere in which a halogen gas such as chlorine is mixed with the non-oxidizing gas. The non-oxidizing gas may contain an oxidizing gas. In that case, the content of the oxidizing gas (particularly, oxygen) is preferably as low as possible, and is usually 1% by volume or less, and preferably 0.1% by volume or less. When the content of the oxidizing gas is not more than the upper limit value, oxidation hardly proceeds in the process of producing the carbonaceous material, desired structure construction easily proceeds, and oxidative decomposition of the produced structure hardly occurs. It is preferable that the non-oxidizing gas does not contain an oxidizing gas.

The feed rate (flow rate) of the non-oxidizing gas is not particularly limited. The feed rate is usually 1 mL/min or more, preferably 10 mL/min or more, further preferably 100 mL/min or more, and is usually 1500 mL/min or less (for example, 1200 mL/min or less, or 1000 mL/min or less) per gram of the carbon precursor. The second carbonization step can also be performed under reduced pressure, for example, at 10 KPa or less.

The temperature raising rate in the second carbonization step is not particularly limited. The temperature raising rate varies depending on a heating method, but is preferably 1 °C/min or more, more preferably 2 °C/min or more, and preferably 20 °C/min or less, more preferably 18 °C/min or less. The temperature raising rate not less than the lower limit value and not more than the upper limit value is preferable from the viewpoint of easily obtaining good productivity and from the viewpoint of economic efficiency. In addition, the progress of activation by a generated dry distillation gas is easily inhibited, and a favorable carbon density is easily obtained.

The temperature of the second carbonization step is preferably 700 °C or higher, more preferably 750 °C or higher, and still more preferably 800 °C or higher (for example, 850 °C or higher and 900 °C or higher.), and is preferably 1400 °C or lower, more preferably 1380 °C or lower, and still more preferably 1350 °C or lower. When the temperature of the second carbonization step is not lower than the lower limit value and not higher than the upper limit value, the residual amount of the functional groups of the carbonaceous material is easily reduced, and the reaction between the carbonaceous material and lithium, which may cause an increase in irreversible capacity, is easily inhibited. In addition, it is easy to inhibit a decrease in the discharge capacity and a decrease in the discharge capacity retention rate due to an increase in the selective orientation of a carbon hexagonal plane. Further, it is easy to obtain desired physical properties (for example, the sulfur element content ratio, the interplanar spacing $d_{002}$, and/or the half-value width of the D band) of the carbonaceous material.

The holding time of the temperature in the second carbonization step is not particularly limited. For example, the time of holding at 800 °C or higher is usually 0.05 hours or more and 10 hours or less, preferably 0.05 hours or more and 3 hours or less, and more preferably 0.05 hours or more and 1.5 hours or less. When the holding time is not less than the lower limit value and not more than the upper limit value, it is easy to obtain desired physical properties (for example, the specific surface area, the interplanar spacing $d_{002}$, the half-value width of the D band, $\rho_{Bt}$, $\rho_{He}$ and/or the true density ratio) of the carbonaceous material. In addition, such a holding time is preferable, since it is a time appropriate from the viewpoint of economic efficiency.

<Thermally Decomposable Substance>

In the second carbonization step, instead of the carbon precursor, a mixture of the carbon precursor and a thermally decomposable substance may be carbonized.

The present inventors have found that the amount of sulfur element on and near the surface of the carbonaceous material can be reduced by carbonizing the mixture of the carbon precursor and the thermally decomposable substance. That is, carbonizing the mixture of the carbon precursor and the thermally decomposable substance makes it easy to obtain a carbonaceous material having desired physical properties (particularly, the sulfur element content ratio). Carbonizing the mixture of the carbon precursor and the thermally decomposable substance can reduce the specific surface area of a resulting carbonaceous material to a desired value.

Although the action mechanism with which carbonizing the mixture of the carbon precursor and the thermally decomposable substance can reduce the amount of sulfur element on and near the surface of the carbonaceous material and the specific surface area of the carbonaceous material has not been clarified in detail, the following is conceivable as a non-limiting action mechanism.

By carbonizing the mixture of the carbon precursor and the thermally decomposable substance, a carbonaceous coating obtained via heat treatment of the thermally decomposable substance is formed on the surface of the carbon precursor. It is considered that the presence of the carbonaceous coating reduces the amount of sulfur element on and near the surface of the carbonaceous material and the specific surface area of the carbonaceous material.

Carbonizing the mixture of the carbon precursor and the thermally decomposable substance in the second carbonization step makes it easy to obtain a carbonaceous material having desired physical properties (particularly, the sulfur element content ratio and the specific surface area).

When the specific surface area has a desired value, a formation reaction of a coating called solid electrolyte interphase (SEI) due to a reaction between the carbonaceous material and an alkali metal (for example, lithium or sodium) is easily inhibited, so that a reduction in irreversible capacity can be expected. In addition, since the carbonaceous coating formed can also be doped and dedoped with lithium or sodium, the effect of increasing the capacity can also be expected.

The thermally decomposable substance is preferably an organic substance capable of sufficiently generating a volatile substance (for example, a hydrocarbon-based gas or a tar component).

The residual carbon rate of the thermally decomposable substance is preferably 5% by mass or less, and more preferably 3% by mass or less from the viewpoint of stable operation of a device for performing the second carbonization step and the viewpoint of uniformity of characteristics of the carbonaceous material (that is, from the viewpoint that a carbonaceous material locally varying in characteristics is hardly formed).

The residual carbon rate is a residual carbon rate taken when the thermally decomposable substance is ashed at 800 °C. The residual carbon rate can be measured by quantifying the amount of carbon in an ignition residue after igniting a sample in an inert gas atmosphere. Specifically, approximately 1 g of a sample (the exact mass thereof is denoted by $W_1$ (g)) is placed in a crucible, and the crucible is heated from room temperature to 800 °C at a temperature raising rate of 10 °C/min in an electric furnace while nitrogen is circulated at 20 L/min, and then ignited at 800 °C for 1 hour. The residue obtained is an ignition residue, and its mass [$W_2$ (g)] is measured.

Thereafter, the ignition residue is subjected to elemental analysis in accordance with the method specified in JIS M 8819, and the mass ratio $P_1$ (mass %) of carbon is measured. The residual carbon rate $P_2$ (% by mass) can be calculated by the following equation.

$$P_2 = P_1 \times W_2 / W_1$$

Examples of such a thermally decomposable substance include, for example, a thermoplastic resin and a low molecular weight organic compound.

Examples of the thermoplastic resin include an olefin-based resin, a styrene-based resin, and a (meth)acrylic acid-based resin. Examples of the olefin-based resin include polyethylene, polypropylene, a random copolymer of ethylene and propylene, and a block copolymer of ethylene and propylene. Examples of the styrene-based resin include polystyrene, poly(α-methylstyrene), and a copolymer of styrene and an alkyl (meth)acrylate (the number of carbon atoms in the alkyl group is 1 to 12, preferably 1 to 6). Examples of the (meth)acrylic acid-based resin include polyacrylic acid, polymethacrylic acid, and a polymer of an alkyl (meth)acrylate (the number of carbon atoms in the alkyl group is 1 to 12, preferably 1 to 6). In this description, (meth)acrylic acid is a generic term for acrylic acid and methacrylic acid.

Examples of the low molecular weight organic compound include a hydrocarbon compound having 1 to 20 carbon atoms. The number of carbon atoms in the hydrocarbon compound is preferably 2 to 18, and more preferably 3 to 16. The hydrocarbon compound may be either a saturated hydrocarbon compound or an unsaturated hydrocarbon compound, and may be either a chain hydrocarbon compound or a cyclic hydrocarbon compound. When the hydrocarbon compound is an unsaturated hydrocarbon compound, the unsaturated bond may be either a double bond or a triple bond, and the number of unsaturated bonds contained in one molecule is not particularly limited. For example, the chain hydrocarbon compound is an aliphatic hydrocarbon compound, examples of which include a linear or branched alkane, alkene, or alkyne. Examples of the cyclic hydrocarbon compound include an alicyclic hydrocarbon compound (for example, a cycloalkane, a cycloalkene, and a cycloalkyne) and an aromatic hydrocarbon compound. Specific examples of the aliphatic hydrocarbon compound include methane, ethane, propane, butane, pentane, hexane, octane, nonane, decane, ethylene, propylene, butene, pentene, hexene, and acetylene. Specific examples of the alicyclic hydrocarbon compound include cyclopentane, cyclohexane, cycloheptane, cyclooctane, cyclononane, cyclopropane, cyclopentene, cyclohexene, cycloheptene, cyclooctene, decalin, norbornene, methylcyclohexane, and norbornadiene. Specific examples of the aromatic hydrocarbon compound include monocyclic aromatic compounds such as benzene, toluene, xylene, mesitylene, cumene, butylbenzene, styrene, α-methylstyrene, o-methylstyrene, m-methylstyrene, p-methylstyrene, vinylxylene, tert-butylstyrene, and ethylstyrene, and 3- to 6-rings condensed polycyclic aromatic compounds such as naphthalene, phenanthrene, anthracene, and pyrene, and the aromatic hydrocarbon compound is preferably a fused polycyclic aromatic compound, and more preferably naphthalene, phenanthrene, anthracene, or pyrene. Here, the hydrocarbon compound may have an arbitrary substituent. The substituent is not particularly limited. Examples of the substituent include an alkyl group having 1 to 4 carbon atoms (preferably an alkyl group having 1 to 2 carbon atoms), an alkenyl group having 2 to 4 carbon atoms (preferably an alkenyl group having 2 carbon atoms), and a cycloalkyl group having 3 to 8 carbon atoms (preferably a cycloalkyl group having 3 to 6 carbon atoms).

The thermally decomposable substance is preferably a solid at ambient temperature from the viewpoint of ease of mixing and uniform dispersibility, and for example, a thermoplastic resin that is solid at ambient temperature, such as polystyrene, polyethylene, or polypropylene, or a low molecular weight organic compound that is solid at ambient temperature, such as naphthalene, phenanthrene, anthracene, or pyrene, is more preferable. The thermoplastic resin is preferably an olefin-based resin or a styrene-based resin, more preferably polyethylene, polypropylene, or polystyrene, since a preferable thermoplastic resin is one that does not oxidize and activate the surface of the carbon precursor when volatilized and thermally decomposed at the temperature of the second carbonization step. It is preferable in safety for the low molecular weight organic compound that the volatility at ambient temperature is as low as possible, and therefore, a hydrocarbon compound having 1 to 20 carbon atoms is preferable, a condensed polycyclic aromatic compound is more preferable, and naphthalene, phenanthrene, anthracene or pyrene is still more preferable. Furthermore, from the viewpoint of ease of mixing with the carbon precursor, thermoplastic resins are preferable, an olefin-based resin and a styrene-based resin are more preferable, polyethylene, polypropylene and polystyrene are still more preferable, and polyethylene and polystyrene are particularly preferable.

The mass ratio of the carbon precursor to the thermally decomposable substance when the carbon precursor and the thermally decomposable substance are mixed is not particularly limited. The mass ratio of the carbon precursor to the thermally decomposable substance is preferably 97:3 to 40:60, more preferably 95:5 to 60:40, and still more preferably 93:7 to 80:20. For example, when the amount of the thermally decomposable substance is 3 parts by mass or more based on 100 parts by mass of the carbon precursor, the specific surface area is easily reduced sufficiently. In addition, the amount of the thermally decomposable substance of 60 parts by mass or less based on 100 parts by mass of the carbon precursor is industrially advantageous, since it is possible to avoid wasteful consumption of the thermally decomposable substance existing in excess though the effect of reducing the specific surface area has saturated.

The mixing of the carbon precursor and the thermally decomposable substance is performed between the first carbonization step and the second carbonization step. When a pulverization step described later is performed between the first carbonization step and the second carbonization step, the mixing may be performed either before the pulverization step or after the pulverization step.

When the carbon precursor and the thermally decomposable substance are mixed before the pulverization step, the pulverization and the mixing can be carried out at the same time by feeding the carbon precursor and the thermally decomposable substance which is a liquid or a solid at ambient temperature simultaneously to a pulverizer while weighing the carbon precursor and the thermally decomposable substance.

When the carbon precursor and the thermally decomposable substance are mixed after the pulverization step, the mixing can be performed by a publicly-known method as long as the method is a method in which both materials are uniformly mixed. When the thermally decomposable substance is a solid at ambient temperature, the thermally decomposable substance is preferably in a particulate form. In that case, the shape or size of the particles is not particularly limited, but from the viewpoint of easily uniformly dispersing the thermally decomposable substance and the pulverized carbon precursor, the volume-average particle size of the thermally decomposable substance is preferably 0.1 to 2000 μm, more preferably 1 to 1000 μm, and still more preferably 2 to 600 μm.

When the thermally decomposable substance is a gas at ambient temperature, a method can be used in which a non-oxidizing gas containing the thermally decomposable substance is circulated in a device for performing the second carbonization step and thermally decomposed to be mixed with the carbon precursor introduced into the device.

The mixture of the carbon precursor and the thermally decomposable substance may contain other components than the carbon precursor and the thermally decomposable substance. For example, the mixture may contain one or more components selected from the group consisting of natural graphite, artificial graphite, a metal-based material, an alloy-based material, and an oxide-based material. When the mixture of the carbon precursor and the thermally decomposable substance contains such a component, the content of the component is not particularly limited, and is preferably 50 parts by mass or less, more preferably 30 parts by mass or less, still more preferably 20 parts by mass or less, and particularly preferably 10 parts by mass or less based on 100 parts by mass of the mixture.

<Pulverization Step>

The method for producing a carbonaceous material may include a pulverization step after the first carbonization step or after the second carbonization step, as necessary. In this step, the carbonized product (carbon precursor or carbonaceous material) aggregated via carbonization can adjusted to a target size by pulverization.

When the pulverization step is performed, this step is preferably performed after the first carbonization step. A reason for this is that increasing the surface area by pulverization can minimize the influence of the structural change due to the decomposition gas generated in the second carbonization step, and appropriately forming a new surface by pulverization makes it easy to obtain a desired sulfur element content ratio. In addition, another reason is that when pulverization is performed after the second carbonization step, there is a possibility that a crystal plane newly generated by the pulverization reacts with an electrolytic solution or the like in a battery, and the battery function is impaired. Therefore, in one preferred embodiment of the present invention, the method for producing a carbonaceous material further includes a pulverization step of pulverizing the carbon precursor to obtain a pulverized product having a volume-average particle size of preferably 45 μm or less, more preferably 35 μm or less, still more preferably 30 μm or less, and particularly preferably 25 μm or less (for example, 20 μm or less, or 15 μm or less). The volume-average particle size is preferably 2 μm or more, more preferably 2.2 μm or more, and particularly preferably 2.5 μm or more (for example, 2.8 μm or more). However, it is not excluded to perform the pulverization after the second carbonization step.

The pulverizer to be used for the pulverization is not particularly limited. For example, a jet mill, a mixer mill, a ball mill, a hammer mill, a rod mill, and the like can be used singly or in combination. From the viewpoint of less generation of a fine powder, a jet mill having a classification function is preferable. On the other hand, when a mixer mill, a ball mill, a hammer mill, a rod mill or the like is used, a fine powder can be removed by performing classification after the pulverization.

<Classification Step>

In the method for producing a carbonaceous material, classification may be performed after the pulverization step that may, as necessary, be performed. By the classification, the volume-average particle size of the carbon precursor or the carbonaceous material can be more accurately adjusted. In addition, by the classification, it is also possible to remove a carbon precursor or a carbonaceous material smaller than a specific dimension (for example, having a volume-average particle size of 1 μm or less) and/or a carbon precursor or a carbonaceous material larger than a specific dimension (for example, having a volume-average particle size of 30 μm or more).

Examples of the classification include classification with a sieve, wet classification, or dry classification. Examples of a wet classifier include classifiers using such a principle as gravity classification, inertial classification, hydraulic classification, or centrifugal classification. Examples of the dry classifier include classifiers utilizing such a principle as sedimentation classification, mechanical classification, or centrifugal classification.

When classification is performed after the pulverization step, as described above, the pulverization and the classification can be performed using a single apparatus (for example, a jet mill having a dry classification function). Alternatively, an apparatus in which the pulverizer and the classifier are independent can be used, and in this case, the pulverization and the classification may be performed either continuously or discontinuously.

In one preferred embodiment of the present invention, the carbonaceous material can be produced by a production method including:

a first carbonization step of carbonizing lignin having a sulfur element content $S_{NDIR}$ determined by the NDIR method of 0.1% by mass or more and a water soluble content of 14% by mass or less at a temperature of 300 °C or higher and lower than 600 °C in a non-oxidizing gas atmosphere to obtain a carbon precursor;

preferably, a pulverization step of pulverizing the carbon precursor to obtain a pulverized product having a volume-average particle size of 45 μm or less; and a second carbonization step of carbonizing the carbon precursor or the pulverized product at a temperature of 700 °C or higher and 1400 °C or lower in a non-oxidizing gas atmosphere to obtain a carbonaceous material.

In one preferred embodiment of the present invention, the carbonaceous material can be produced by a production method including:

a mixing step of mixing lignin having a sulfur element content $S_{NDIR}$ determined by the NDIR method of 0.1% by mass or more and a water soluble content of 14% by mass or less with a condensing agent;

a condensation step of condensing the lignin in the resulting mixture;

a first carbonization step of carbonizing the resulting condensate in a non-oxidizing gas atmosphere to obtain a carbon precursor;

preferably, a pulverization step of pulverizing the carbon precursor to obtain a pulverized product having a volume-average particle size of 45 μm or less; and a second carbonization step of carbonizing the carbon precursor or the pulverized product at a temperature of 700 °C or higher and 1400 °C or lower in a non-oxidizing gas atmosphere to obtain a carbonaceous material.

In one preferred embodiment of the present invention, the carbonaceous material can be produced by a production method including:

a first carbonization step of carbonizing lignin having a sulfur element content $S_{NDIR}$ determined by the NDIR method of 0.1% by mass or more and a water soluble content of 14% by mass or less under a non-oxidizing gas atmosphere to obtain a carbon precursor;

preferably, a pulverization step of pulverizing the carbon precursor to obtain a pulverized product having a volume-average particle size of 45 μm or less;

a mixing step of mixing the carbon precursor or the pulverized product with a thermally decomposable substance; and a second carbonization step of carbonizing the resulting mixture at a temperature of 700 °C or higher and 1400 °C or lower in a non-oxidizing gas atmosphere to obtain a carbonaceous material.

To the lignin, the first carbonization step, the condensing agent, the second carbonization step, the thermally decomposable substance, the pulverization step, and the classification step in the production method of the three preferred embodiments of the present invention described above, the preferred embodiments described in the paragraphs of <Starting Material>, <First Carbonization Step>, <Condensing Agent>, <Second Carbonization Step>, <Thermally Decomposable Substance>, <Pulverization Step>, and <Classification Step> described above can be applied, respectively.

[Electrode]

The carbonaceous material of the present invention can be used for an electrode. Accordingly, the present invention is also directed to an electrode comprising the carbonaceous material of the present invention.

[Method for Manufacturing Electrode]

The electrode of the present invention can be manufactured, for example, by kneading a carbonaceous material, a bonding agent (a binder), and a solvent to prepare an electrode mixture, applying the electrode mixture to one side or both sides of a current collector plate made of a metal plate or the like, drying the electrode mixture, and pressure-molding the resulting current collector plate with an electrode active material layer.

The bonding agent is not particularly limited as long as it does not react with an electrolytic solution. Examples of the bonding agent include PVDF (polyvinylidene fluoride), polytetrafluoroethylene, and a mixture of SBR (styrene-butadiene rubber) and CMC (carboxymethyl cellulose). In particular, PVDF is preferable, since PVDF attached to a surface of an active material hardly inhibits lithium ion transfer to obtain good input/output characteristics. In order to dissolve PVDF to produce a slurry, a polar solvent such as N-methylpyrrolidone (NMP) is preferably used, but an aqueous emulsion of SBR or the like or an aqueous solution of CMC can also be used. Adding too much bonding agent is not preferred, since it increases the resistance of a resulting electrode, increases the internal resistance of a battery, and deteriorates battery characteristics. In addition, adding too little bonding agent is not preferred, since it results in insufficient bonding negative electrode material particles and between the negative electrode material particles and the current collector. The preferred addition amount of the bonding agent varies depending on the type of the bonding agent to be used, but in the case of a PVDF-based bonding agent, the addition amount is preferably 2 to 13% by mass, and more preferably 2 to 10% by mass based on the total mass of the carbonaceous material and the bonding agent. On the other hand, as a bonding agent using water as a solvent, a plurality of bonding agents such as a mixture of SBR and CMC are often mixed and used, and the total addition amount of the bonding agent to be used is preferably 0.5 to 5% by mass, and more preferably 1 to 4% by mass based on the total mass of the carbonaceous material and the bonding agent.

Use of the carbonaceous material of the present invention makes it possible to manufacture an electrode having high conductivity without adding a conductive assistant, but for the purpose of imparting higher conductivity, a conductive assistant may be added when preparing an electrode mixture, as necessary. As the conductive assistant, conductive carbon black, vapor-grown carbon fibers (VGCF), nanotubes, etc. may be used singly, or two or more thereof may be used in combination. The addition amount varies depending on the type of the conductive assistant to be used. Adding too little conductive assistant is not preferred since it is unlikely to provide expected conductivity, and adding too much conductive assistant is not preferred since it deteriorates dispersion of the conductive assistant in the electrode mixture. From such viewpoints, the proportion of the conductive assistant in the case of adding the conductive assistant is preferably 0.5 to 10% by mass, where the total amount of the active material (carbonaceous material), the bonding agent, and the conductive assistant is 100% by mass, more preferably 0.5 to 7% by mass, and still more preferably 0.5 to 5% by mass.

The electrode active material layer is usually formed on both sides of the current collector plate, but may be formed on one side, as necessary. The thicker the electrode active material layer, the less the current collector plate, the separator, and so on are required, and the more preferable it is for enhancing the capacity. However, an electrode active material layer that is too thick is not preferable, since it increases ion diffusion resistance in an electrode and deteriorates input-output characteristics. The thickness of the electrode active material layer (per one side) is preferably 10 to 80 μm, more preferably 20 to 75 μm, and still more preferably 20 to 60 μm.

[Battery]

The present invention is also directed to a battery comprising the electrode of the present invention. Since the battery of the present invention, for example, a non-aqueous electrolyte secondary battery is manufactured using a negative electrode using the carbonaceous material of the present invention, the battery can have improved discharge capacity, charge/discharge efficiency, initial direct current resistance, and discharge capacity retention rate.

In the non-aqueous electrolyte secondary battery in the present invention, materials of elements other than the electrode (negative electrode) of the present invention, namely, materials of a positive electrode material, a separator, an electrolytic solution, etc. are not particularly limited, and various materials conventionally used or proposed for non-aqueous electrolyte secondary batteries can be used.

For example, as the positive electrode material, composite metal chalcogen compounds such as layered oxide-based compounds [compounds represented by $LiMO_2$ wherein M represents a metal; for example, $LiCoO_2$, $LiNiO_2$, $LiMnO_2$ or $LiNi_xCo_yMo_zO_2$ wherein x, y, and z represent composition ratios], olivine-based compounds [compounds represented as $LiMPO_4$ wherein M represents a metal; for example, $LiFePO_4$], and spinel-based compounds [compounds represented by $LiM_2O_4$ wherein M represents a metal; for example, $LiMn_2O_4$] are preferable, and these composite metal chalcogen compounds may be mixed, as necessary. For example, a positive electrode can be manufactured by forming these positive electrode materials together with an appropriate bonding agent and a carbonaceous material for imparting conductivity to the electrode, and forming a layer on a conductive current collector.

The non-aqueous solvent type electrolytic solution to be used in combination with the positive electrode and the negative electrode is generally formed by dissolving an electrolyte in a non-aqueous solvent. As the non-aqueous solvent, for example, one organic solvent or a combination of two or more organic solvents among propylene carbonate, ethylene carbonate, dimethyl carbonate, diethyl carbonate, ethyl methyl carbonate, dimethoxyethane, diethoxyethane, γ-butyl lactone, tetrahydrofuran, 2-methyltetrahydrofuran, sulfolane, and 1,3-dioxolane can be used. In addition, as the electrolyte, for example, $LiClO_4$, $LiPF_6$, $LiBF_4$, $LiCF_3SO_3$, $LiAsF_6$, LiCl, LiBr, $LiB(C_6H_5)_4$, or $LiN(SO_3CF_3)_2$ can be used.

The non-aqueous electrolyte secondary battery is generally manufactured by making the positive electrode and the negative electrode produced as described above face each other with a permeable separator (for example, nonwoven fabric or other porous material) interposed therebetween, as necessary, and immersing the positive electrode and the negative electrode in an electrolytic solution. Instead of the separator or together with the separator, a solid electrolyte composed of a polymer gel impregnated with an electrolytic solution can also be used.

In one preferred embodiment, the discharge capacity of the battery of the present invention is preferably 420 mAh/g or more, more preferably 450 mAh/g or more, still more preferably 480 mAh/g or more, and particularly preferably 520 mAh/g or more.

In another preferred embodiment, the charge/discharge efficiency of the battery of the present invention is preferably 75% or more, more preferably 78% or more, and particularly preferably 80% or more.

In another preferred embodiment, the initial direct current resistance of the battery of the present invention is preferably 700 (2 or less, more preferably 660 £2 or less, and particularly preferably 610 (2 or less.

In another preferred embodiment, the retention rate (discharge capacity retention rate) of the discharge capacity at the 50th cycle to the discharge capacity at the first cycle of the battery of the present invention is preferably 83% or more, more preferably 85% or more, and particularly preferably 90% or more. The discharge capacity, the charge/discharge efficiency, the initial direct current resistance, and the discharge capacity retention rate can be measured by the methods described in Examples described later.

EXAMPLES

Hereinafter, the present invention is described specifically by way of Examples, but these do not limit the scope of the present invention.

[Analysis Method]

<Sulfur Element Content $S_{NDIR}$ Determined by NDIR Method>

The sulfur element content of a carbonaceous material was measured by the NDIR method using a "carbon/sulfur analyzer EMIA-920V2" manufactured by HORIBA, Ltd. The detection method in this apparatus is a combustion in oxygen stream (high-frequency induction heating furnace system)-non-dispersive infrared absorption method (NDIR method).

A pretreatment was performed by subjecting a measurement sample (carbonaceous material) to a dehydration treatment at 250 °C for about 10 minutes. 50 mg of the measurement sample after the pretreatment, and 1.5 g of particulate tungsten and 0.3 g of particulate tin, both of which are combustion aids, were weighed in an alumina crucible. The alumina crucible was placed in an apparatus, and degassing was performed for 30 seconds. Then, heating and combustion was performed using a high frequency under a pure oxygen stream, and the generated gas was analyzed to determine the sulfur element content.

In addition, calibration was performed by performing blank measurement using only particulate tungsten and particulate tin without using the measurement sample, measurement using JSS 152-18 [C: 0.277% by mass, S: 0.0056% by mass], which is a Japanese Iron and Steel certified reference material, in place of the carbonaceous material, and measurement using JSS 150-16 [S: 0.0296% by mass], which is a Japan Iron and Steel certified reference material, in place of the carbonaceous material.

Three measurement samples were measured for each carbonaceous material, and the average value thereof was taken as the $S_{NDIR}$ of the carbonaceous material.

The sulfur element content of the lignin used as a starting material was also measured in the same manner.

<Sulfur Element Content $S_{XPS}$ Determined by XPS Method>

Peaks derived from C1s, Si2p, O1s, N1s, and S1s of a carbonaceous material were observed using a "scanning X-ray photoelectron spectrometer PHI Quantera SXM" manufactured by ULVAC-PHI, Inc., and the composition ratio of the elements constituting the carbonaceous material was confirmed. From this composition ratio, the sulfur element content was determined. Three measurement samples were measured for each carbonaceous material, and the average value thereof was taken as the $S_{XPS}$ of the carbonaceous material. The detailed measurement conditions are as follows.

X-ray source: monochromated A1Kα (1486.6 eV)

X-ray beam diameter: 100 μm (25 W, 15 kV)

Measurement range: 1000 μm×300 μm

Signal capture angle: 45° charge neutralization conditions: neutralization electron gun, Ar+ ion gun Degree of vacuum: $1\times10^{-6}$ Pa <Ratio of $S_{XPS}$ to $S_{NDIR}$>

The ratio of $S_{XPS}$ to $S_{NDIR}$ was determined from the $S_{NDIR}$ and the $S_{XPS}$ of each carbonaceous material.

<Specific Surface Area>

An approximation derived from the BET equation is given below.

$$p/[v(p_0-p)] = (1/v_mc) + [(c-1)/v_mc](p/p_0) \quad \text{[Mathematical formula 1]}$$

Using the approximation given above, $v_m$ was determined by a three-point method by nitrogen adsorption at liquid nitrogen temperature, and the specific surface area of the sample was calculated from the following equation.

$$\text{Specific surface area} = \left(\frac{v_m Na}{22400}\right)\times 10^{-18} \quad \text{[Mathematical formula 2]}$$

Here, $v_m$ is the nitrogen adsorption amount ($cm^3/g$) required to form a monomolecular layer on the sample surface, v is the actually measured nitrogen adsorption amount ($cm^3/g$), $p_0$ is the saturated vapor pressure, p is the absolute pressure, c is the constant (reflecting the adsorption heat), N is the Avogadro's number $6.022\times10^{23}$, and a ($nm^2$) is the area occupied by the adsorbate molecules on the sample surface (molecular-occupied cross-sectional area).

Specifically, a sample tube containing the carbonaceous material was placed in "BELSORP MINI" manufactured by BEL JAPAN, Inc., and decompressed once while being cooled to −196 °C. Thereafter, nitrogen (purity: 99.999%) was introduced into the sample tube, and the carbonaceous material was allowed to adsorb nitrogen at a prescribed relative pressure. The amount of nitrogen adsorbed to the carbonaceous material at the point in time when the equilibrium pressure was reached at each relative pressure was defined as a nitrogen adsorption amount v.

<Volume-Average Particle Size>

A carbonaceous material was charged into an aqueous solution containing 0.3% by mass of a surfactant ("Triton X100" manufactured by Wako Pure Chemical Industries, Ltd.), and treated with an ultrasonic cleaner for 10 minutes or more, and the carbonaceous material was thereby dispersed in the aqueous solution. The particle size distribution was measured using this dispersion. The particle size distribution measurement was performed using a laser diffraction/scattering type particle size/particle size distribution analyzer ("Microtrac MT3000" manufactured by Nikkiso Co., Ltd.). $D_{50}$ is the particle size at which the cumulative volume was 50%, and this value was used as the volume-average particle size.

<Interplanar Spacing $d_{002}$ of (002) Plane>

A sample holder into which a sample was introduced was installed in a desktop X-ray diffractometer "MiniFlexII" manufactured by Rigaku Corporation. An X-ray diffraction pattern was obtained using a CuKα ray monochromated with a Ni filter as a radiation source. The peak position of the X-ray diffraction pattern was determined in accordance with a centroid method (a method involving determining the position of the center of gravity of the diffraction pattern, and determining a peak position at a 2θ value corresponding thereto), and corrected with a diffraction peak of the (111) plane of a high-purity silicon powder for a reference material. The wavelength of the CuKα ray was set to 0.15418 nm, and the interplanar spacing $d_{002}$ was calculated by the Bragg's equation given below.

(Bragg's equation)

$$d_{002} = \frac{\lambda}{2\cdot\sin\theta} \quad \text{[Mathematical formula 3]}$$

<Half-Value Width of D Band Near 1360 $cm^{-1}$ in Raman Spectrum>

A Raman spectrum was measured using a light source having a laser wavelength of 532 nm and using "LabRAM ARAMIS" manufactured by HORIBA, Ltd. Specifically, three samples were randomly taken from each carbonaceous material, and measurement was performed at two positions for each of the samples. The measurement conditions were a wavelength range of 50 to 2000 $cm^{-1}$ and an accumulation number of 100, and the average of the measurements taken at six positions in total was adopted as the Raman spectrum of the carbonaceous material.

The Raman spectrum obtained was fitted with a Gaussian function and thereby subjected to peak separation between a D band (near 1360 $cm^{-1}$) and a G band (near 1590 $cm^{-1}$), and then the half-value width of the D band was determined.

<True Density $\rho_{He}$ Determined by Helium Method>

For each carbonaceous material, the helium true density was measured using "Ultrapyc 1200e" manufactured by Quantachrome Corporation and using helium as a substitution medium.

<True Density $\rho_{Bt}$ Determined by Butanol Method>

In accordance with JIS R 7212:1995, the true density $\rho_{Bt}$ of a carbonaceous material was measured by a butanol method. A specific procedure is described below.

The mass ($m_1$) of a pycnometer with a bypass line having an internal volume of approximately 40 mL was accurately measured. Next, a sample was introduced flatly such that the thickness of the sample from the bottom of the pycnometer with a bypass line was about 10 mm, and then the mass ($m_2$) of the pycnometer with a bypass line containing the sample was accurately measured. 1-Butanol was gently added such that the depth from the bottom of the pycnometer with a bypass line to the liquid surface was about 20 mm. Subsequently, the pycnometer with a bypass line was gently oscillated, and after it was confirmed that no large air bubbles were formed, the pycnometer with a bypass line was placed in a vacuum desiccator and the inside of the vacuum desiccator was gradually evacuated so that the pressure in the vacuum desiccator was 2.0 to 2.7 kPa. This pressure was maintained for 20 minutes or longer, and after the generation of air bubbles stopped, the pycnometer with a bypass line was taken out. To the pycnometer with a bypass line was further added 1-butanol, and a stopper was inserted. Then, the pycnometer was immersed in a constant-temperature water bath (adjusted to 30±0.03 °C) for 15 minutes or longer, and the liquid surface of 1-butanol was aligned with a marked line. Subsequently, the pycnometer with a bypass line was taken out, thoroughly wiped, and then cooled to room temperature, and the mass ($m_4$) was then accurately measured.

Next, the same pycnometer with a bypass line was filled only with 1-butanol and immersed in a constant-temperature water bath in the same manner as described above. The liquid surface was aligned with the marked line, and then the mass ($m_3$) was measured.

In addition, distilled water which was boiled immediately before use and from which the dissolved gas was thereby removed was introduced into the pycnometer and immersed in a constant-temperature water bath in the same manner as described above. After the liquid surface was aligned with the marked line, the mass ($m_5$) was measured.

The true density $\rho_{Bt}$ was calculated using the following equation. Here, d is the specific gravity (0.9946) of water at 30 °C.

$$\rho_{Bt} = \frac{m_2 - m_1}{m_2 - m_1 - (m_4 - m_3)} \times \frac{m_3 - m_1}{m_5 - m_1} d \quad \text{[Mathematical formula 4]}$$

<Ratio of $\rho_{Bt}$ to $\rho_{He}$>

The ratio of $\rho_{Bt}$ to $\rho_{He}$ ($\rho_{Bt}/\rho_{He}$) was determined from $\rho_{He}$ and $\rho_{Bt}$ of each carbonaceous material.

Example 1

18.0 g of lignin having a sulfur element content of 2% by mass determined by the NDIR method, a melting point of 250 °C, and a water soluble content of 2.7% by mass was put in a boat crucible, and the boat crucible was introduced into a tubular furnace (tube diameter: 200 mm× tube length: 1800 mm) manufactured by Motoyama Co., Ltd. Nitrogen was introduced at a flow rate of 5 L/min for 1 hour to replace the inside of the furnace with nitrogen. The temperature was raised from room temperature to 400 °C. (temperature raising rate: 2.5 °C/min), maintained at 400 °C for 1 hour (first carbonization step), and then naturally cooled from 400 °C to room temperature, and a carbon precursor was then taken out. 8.18 g of the carbon precursor were obtained (recovery rate: 45.4% by mass).

The carbon precursor obtained was pulverized with a mixer mill, obtaining a pulverized product having a volume-average particle size of 5.0 μm.

A mixture obtained by mixing 7.00 g of the pulverized product and 0.70 g of polystyrene was placed in a boat crucible and the boat crucible was introduced into the tubular furnace again. Nitrogen was introduced at a flow rate of 5 L/min for 1 hour to replace the inside of the furnace with nitrogen. The temperature was raised from room temperature to 1000 °C. (temperature raising rate: 10 °C/min), maintained at 1000 °C for 30 minutes (second carbonization step), and then cooled from 1000 °C to room temperature over 12 hours, and a carbonaceous material was then taken out. 6.30 g of the carbonaceous material were obtained (recovery rate: 90.0% by mass).

Physical properties of the carbonaceous material obtained are shown in Table 1.

Example 2

A carbonaceous material was obtained in the same manner as in Example 1 except that the temperature in the second carbonization step was changed from 1000 °C to 900 °C. The volume-average particle size of the pulverized product was 4.7 μm, and the recovery rate of the carbonaceous material was 88.3% by mass. Physical properties of the carbonaceous material obtained are shown in Table 1.

Example 3

A carbonaceous material was obtained in the same manner as in Example 1 except that the temperature in the second carbonization step was changed from 1000 °C to 800 °C. The volume-average particle size of the pulverized product was 4.6 μm, and the recovery rate of the carbonaceous material was 88.4% by mass. Physical properties of the carbonaceous material obtained are shown in Table 1.

Example 4

A carbonaceous material was obtained in the same manner as in Example 1 except that the temperature in the second carbonization step was changed from 1000 °C to 1300 °C. The volume-average particle size of the pulverized product was 4.8 μm, and the recovery rate of the carbonaceous material was 86.9% by mass. Physical properties of the carbonaceous material obtained are shown in Table 1.

Example 5

A carbonaceous material was obtained in the same manner as in Example 1 except that the polystyrene was not added. The volume-average particle size of the pulverized product was 4.7 μm, and the recovery rate of the carbonaceous material was 98.4% by mass. Physical properties of the carbonaceous material obtained are shown in Table 1.

Example 6

In a 1 L separable flask, 60 g of lignin having a sulfur element content of 2% by mass determined by the NDIR method, a melting point of 250 °C, and a water soluble content of 4% by mass was weighed. 570 mL of ion-exchanged water was added thereto, and 200 mL of ammonia water (28% by mass) was added thereto while stirring with a mechanical stirrer. Furthermore, 20.4 mL of an aqueous formaldehyde solution (36% by mass) and a mixed solution of 5 mL of ammonia water (28% by mass) and 0.5 g of acetic acid were added thereto, and the mixture was stirred at room temperature for 20 minutes. Then, the separable flask was placed in an oil bath (adjusted to 80 °C), and the mixture was stirred at an internal temperature of the separable flask of 80 °C for 1.5 hours. Thereafter, the mixture was cooled to room temperature with stirring, obtaining an aqueous lignin solution.

The resulting aqueous solution was distilled at a bath temperature of 80 °C with a pressure reduction of 3 kPa using an evaporator, and 400 g of water was distilled off. The resulting concentrated solution was transferred to a 1 L beaker, and dried and solidified at 80 °C for 12 hours in an explosion-proof hot-air dryer. The resulting solidified product weighed 45 g (recovery rate: 75% by mass).

10.0 g of the solidified product obtained was placed in a boat crucible, and the boat crucible was introduced into a tubular furnace (tube diameter: 200 mm× tube length: 1800 mm) manufactured by Motoyama Co., Ltd. Nitrogen was introduced at a flow rate of 10 L/min for 1 hour to replace the inside of the furnace with nitrogen. The temperature was raised from room temperature to 600 °C. (temperature raising rate: 2.5 °C/min), maintained at 600 °C for 1 hour (first carbonization step), and then naturally cooled from 600 °C to room temperature, and a carbon precursor was then taken out. 5.8 g of the carbon precursor were obtained (recovery rate: 58.0% by mass).

The carbon precursor obtained was pulverized with a mixer mill, obtaining a pulverized product having a volume-average particle size of 5.5 μm.

5.0 g of the pulverized product was placed in a boat crucible and the boat crucible was introduced into the tubular furnace again. Nitrogen was introduced at a flow rate of 5 L/min for 1 hour to replace the inside of the furnace with nitrogen. The temperature was raised from room temperature to 1200 °C. (temperature raising rate: 10 °C/min), maintained at 1200 °C for 30 minutes (second carbonization step), and then cooled from 1200 °C to room temperature over 12 hours, and a carbonaceous material was then taken out. 4.52 g of the carbonaceous material were obtained (recovery rate: 90.4% by mass).

Physical properties of the carbonaceous material obtained are shown in Table 1.

Comparative Example 1

A carbonaceous material was obtained in the same manner as in Example 1 except that the temperature in the second carbonization step was changed from 1000 °C to 1420 °C. The volume-average particle size of the pulverized product was 4.7 μm, and the recovery rate of the carbonaceous material was 83.1% by mass. Physical properties of the carbonaceous material obtained are shown in Table 1.

Comparative Example 2

A carbonaceous material was obtained in the same manner as in Example 1 except that lignin having a sulfur element content of 6% by mass determined by the NDIR method, a melting point of 182 °C, and a water soluble content of 15% by mass was used. The volume-average particle size of the pulverized product was 4.8 μm, and the recovery rate of the carbonaceous material was 83.1% by mass. Physical properties of the carbonaceous material obtained are shown in Table 1.

Comparative Example 3

18.0 g of lignin having a sulfur element content of 2% by mass determined by the NDIR method, a melting point of 232 °C, and a water soluble content of 15% by mass was put in a boat crucible, and the boat crucible was introduced into a tube furnace (tube diameter: 200 mm× tube length: 1800 mm) manufactured by Motoyama Co., Ltd. Nitrogen was introduced at a flow rate of 10 L/min for 1 hour to replace the inside of the furnace with nitrogen. The temperature was raised from room temperature to 600 °C. (temperature raising rate: 2.5 °C/min), maintained at 600 °C for 1 hour (first carbonization step), and then naturally cooled from 600 °C to room temperature, and a carbon precursor was then taken out. 8.18 g of the carbon precursor were obtained (recovery rate: 45.4% by mass).

The carbon precursor obtained was pulverized with a mixer mill, obtaining a pulverized product having a volume-average particle size of 8.2 μm.

7.06 g of the pulverized product was placed in a boat crucible and the boat crucible was introduced into the tubular furnace again. Nitrogen was introduced at a flow rate of 5 L/min for 1 hour to replace the inside of the furnace with nitrogen. The temperature was raised from room temperature to 1000 °C. (temperature raising rate: 10 °C/min), maintained at 1000 °C for 30 minutes (second carbonization step), and then cooled from 1000 °C to room temperature over 12 hours, and a carbonaceous material was then taken out. 6.37 g of the carbonaceous material were obtained (recovery rate: 90.2% by mass).

Physical properties of the carbonaceous material obtained are shown in Table 1.

Comparative Example 4

A carbonaceous material was obtained in the same manner as in Comparative Example 3 except that the temperature in the second carbonization step was changed from 1000 °C to 1200 °C. The volume-average particle size of the pulverized product was 8.2 μm, and the recovery rate of the carbonaceous material was 84.4% by mass. Physical properties of the carbonaceous material obtained are shown in Table 1.

Comparative Example 5

A carbonaceous material was obtained in the same manner as in Example 1 except that lignin having a sulfur element content of 2% by mass determined by the NDIR method, a melting point of 217 °C, and a water soluble content of 15% by mass was used, and the flow rate of nitrogen in the first carbonization step was changed from 5 L/min to 10 L/min. The recovery rate of the carbon precursor was 51.0% by mass, the volume-average particle size of the pulverized product was 7.8 μm, and the recovery rate of the carbonaceous material was 87.3% by mass. Physical properties of the carbonaceous material obtained are shown in Table 1.

Comparative Example 6

A carbonaceous material was obtained in the same manner as in Example 1 except that the flow rate of nitrogen in the first carbonization step was changed from 5 L/min to 10 L/min, the temperature in the first carbonization step was changed from 400 °C to 600 °C, and the polystyrene was not added. The volume-average particle size of the pulverized product was 4.7 μm, and the recovery rate of the carbonaceous material was 89.1% by mass. Physical properties of the carbonaceous material obtained are shown in Table 1.

pared in accordance with the procedure described above. As the electrolytic solution, a solution (concentration: 1 mol/L) prepared by dissolving the electrolyte $LiPF_6$ in a solvent obtained by mixing ethylene carbonate, dimethyl carbonate, and ethyl methyl carbonate at a volume ratio of 1:1:1 was used. As the separator, a polypropylene film was used. A coin cell was prepared in a glove box under an argon atmosphere.

<Charge-Discharge Test of Non-aqueous Electrolyte Secondary Battery>

The non-aqueous electrolyte secondary battery prepared was subjected to a charge-discharge test at 25 °C using a charge/discharge tester ("TOSCAT" manufactured by Toyo System Co., Ltd.).

Specifically, a lithium doping reaction of lithium to a carbon electrode was performed by a constant current/constant voltage method, and a de-doping reaction was performed by a constant current method. Here, in a battery using lithium metal for the positive electrode, the doping reaction of lithium to the carbon electrode is called "charging", and in a battery using lithium metal for the counter electrode as in the test battery of the present invention, the doping reaction to the carbon electrode is called "discharging", and the name of the doping reaction of lithium to the same carbon electrode varies depending on the counter electrode used. With this being the situation, the doping reaction of lithium to the carbon electrode is herein described as "charging" for convenience. Conversely, "discharging" is a charging reaction in a test battery, but is a dedoping reaction of lithium from a carbonaceous material, and thus is described as "discharging" for convenience. In the constant current/constant voltage method, specifically, after the initial direct current resistance ((2) was measured, constant current charging was performed at 0.5 mA/cm$^2$ until the terminal voltage reached 0 mV. After the terminal voltage reached 0 mV, constant voltage charging was performed at the terminal voltage of 0 mV, and charging was continued until the current value reached 20 μA. A value determined by dividing the total charge capacity at this time by the mass of the carbonaceous material of the electrode is defined as a charge capacity (mAh/g) per unit mass of the carbonaceous material. After the completion of charging, the battery circuit was opened for 30 minutes, and then discharging was performed. Discharging was performed at a

TABLE 1

| | | Sulfur element content $S_{XPS}$ % by mass | Sulfur element content $S_{NDIR}$ % by mass | Ratio of sulfur element contents $S_{XPS}/S_{NDIR}$ | Specific surface area m$^2$/g | Volume-average particle size μm | Inter-planar spacing $d_{002}$ Å | Half-value width of D band cm$^{-1}$ | True density $\rho_{Bt}$ g/cm$^3$ | True density $\rho_{He}$ g/cm$^3$ | True density ratio $\rho_{Bt}/\rho_{He}$ |
|---|---|---|---|---|---|---|---|---|---|---|---|
| Example | 1 | 0.22 | 0.92 | 0.24 | 12.8 | 4.5 | 3.85 | 236 | 1.49 | 2.01 | 0.741 |
| | 2 | 0.23 | 0.98 | 0.23 | 15.7 | 4.5 | 3.86 | 257 | 1.48 | 2.03 | 0.729 |
| | 3 | 0.56 | 0.91 | 0.62 | 18.3 | 4.4 | 3.86 | 261 | 1.46 | 2.01 | 0.726 |
| | 4 | 0.19 | 0.91 | 0.21 | 6.7 | 4.7 | 3.84 | 228 | 1.57 | 2.06 | 0.762 |
| | 5 | 0.27 | 0.92 | 0.29 | 17.5 | 4.5 | 3.89 | 242 | 1.61 | 2.08 | 0.774 |
| | 6 | 0.23 | 0.92 | 0.25 | 10.9 | 5.4 | 3.91 | 268 | 1.47 | 2.03 | 0.724 |
| Comparative Example | 1 | 0.09 | 0.76 | 0.12 | 3.3 | 4.3 | 3.74 | 198 | 1.61 | 2.09 | 0.770 |
| | 2 | 1.42 | 1.77 | 0.80 | 14.4 | 4.5 | 3.89 | 266 | 1.44 | 2.07 | 0.695 |
| | 3 | 0.22 | 1.12 | 0.20 | 60.0 | 7.9 | 3.85 | 244 | 1.52 | 2.04 | 0.745 |
| | 4 | 0.19 | 1.05 | 0.18 | 5.93 | 7.6 | 3.86 | 260 | 1.54 | 2.04 | 0.755 |
| | 5 | 0.21 | 1.13 | 0.19 | 48.8 | 7.8 | 3.87 | 247 | 1.51 | 2.02 | 0.748 |
| | 6 | 0.20 | 1.17 | 0.17 | 47.7 | 4.7 | 3.81 | 241 | 1.55 | 2.02 | 0.770 |

[Doping-Dedoping Test]

Negative electrodes and non-aqueous electrolyte secondary batteries were produced using the carbonaceous materials obtained in Examples and Comparative Examples, and the performance thereof was evaluated.

<Production of Negative Electrode>

95 parts by mass of a carbonaceous material, 2 parts by mass of conductive carbon black ("Super-P (registered trademark)" manufactured by TIMCAL Ltd.), 3 parts by mass of polyvinylidene fluoride (manufactured by Kureha Corporation), and 90 parts by mass of N-methyl-2-pyrrolidone were mixed, obtaining a slurry. The slurry obtained was applied to one side of a copper foil having a thickness of 18 μm, dried, and then pressed, obtaining an electrode having a thickness of 45 μm.

<Preparation of Non-aqueous Electrolyte Secondary Battery>

In order to precisely evaluate the discharge capacity (dedoping capacity) and the irreversible capacity (non-dedoping capacity) of a battery active material without being affected by fluctuation in the performances of a counter electrode, a non-aqueous electrolyte secondary battery was prepared using a lithium metal with stable characteristics as a counter electrode and using the negative electrode preconstant current of 0.5 $mA/cm^2$, and the final voltage was set to 1.5 V. A value determined by dividing the amount of electricity discharged at this time by the mass of the carbonaceous material of the electrode is defined as a discharge capacity (mAh/g) per unit mass of the carbonaceous material. The ratio of the discharge capacity to the charge capacity (discharge capacity/charge capacity) was defined as the charge/discharge efficiency (%), and was used as an index of the utilization efficiency of lithium ions in the battery. Further, the charge-discharge was performed 50 cycles, and the retention rate of the discharge capacity at the 50th cycle to the discharge capacity at the first cycle (discharge capacity retention rate) was determined and used as an index of stabilization of battery performance.

The results are summarized in Table 2.

TABLE 2

| | | Discharge capacity mAh/g | Charge/ discharge efficiency % | Initial direct current resistance Ω | 50-Cycles discharge capacity retention rate % |
|---|---|---|---|---|---|
| Example | 1 | 489 | 82.2 | 623 | 90.9 |
| | 2 | 492 | 79.3 | 639 | 89.3 |
| | 3 | 499 | 78.6 | 641 | 92.2 |
| | 4 | 467 | 81.3 | 607 | 86.2 |
| | 5 | 459 | 76.2 | 533 | 90.6 |
| | 6 | 552 | 81.1 | 691 | 92.2 |
| Comparative Example | 1 | 412 | 85.5 | 479 | 81.4 |
| | 2 | 512 | 67.1 | 773 | 77.3 |
| | 3 | 474 | 67.1 | 840 | 86.3 |
| | 4 | 458 | 77.9 | 891 | 83.3 |
| | 5 | 441 | 83.3 | 617 | 87.1 |
| | 6 | 439 | 81.1 | 799 | 79.9 |

From the results in Table 2, it is found that by use of the carbonaceous material of the present invention, a battery having improved discharge capacity, charge/discharge efficiency, initial direct current resistance and discharge capacity retention rate can be produced.

On the other hand, it can be seen that the carbonaceous materials of the comparative examples result in only batteries poor in at least one of discharge capacity, charge/discharge efficiency, initial direct current resistance, and discharge capacity retention rate.

INDUSTRIAL APPLICABILITY

A battery including an electrode containing the carbonaceous material of the present invention can have improved discharge capacity, charge/discharge efficiency, initial direct current resistance and discharge capacity retention rate. Therefore, it may be applicable to various batteries.

The invention claimed is:

1. A carbonaceous material having:

a ratio of a sulfur element content $S_{XPS}$ determined by an XPS method to a sulfur element content $S_{NDIR}$ determined by an NDIR method ($S_{XPS}/S_{NDIR}$) of 0.20 or more and 0.78 or less; and a specific surface area determined by a BET method of 40 $m^2/g$ or less.

2. The carbonaceous material according to claim 1, wherein the $S_{NDIR}$ is 2.00% by mass or less based on a total mass of the carbonaceous material.

3. The carbonaceous material according to claim 1, wherein the $S_{XPS}$ is 1.40% by mass or less based on a total mass of the carbonaceous material.

4. The carbonaceous material according to claim 1, wherein the specific surface area determined by the BET method is 1.0 $m^2/g$ or more.

5. The carbonaceous material according to claim 1, wherein the carbonaceous material has a volume-average particle size of 2 μm or more and 40 μm or less.

6. The carbonaceous material according to claim 1, wherein an interplanar spacing $d_{002}$ of a (002) plane of the carbonaceous material measured using a CuKα ray is 3.75 Å or more and 3.95 Å or less.

7. The carbonaceous material according to claim 1, wherein a half-value width of a D band near 1360 $cm^{-1}$ in a Raman spectrum of the carbonaceous material is 200 $cm^{-1}$ or more and 270 $cm^{-1}$ or less.

8. The carbonaceous material according to claim 1, wherein a ratio of a true density $\rho_{Bt}$ determined by a butanol method to a true density $\rho_{He}$ determined by a helium method ($\rho_{Bt}/\rho_{He}$) is 0.71 or more and 0.85 or less.

9. An electrode comprising the carbonaceous material according to claim 1.

10. A battery comprising the electrode according to claim 9.

* * * * *